S. IRINO.
ROTARY MEASURING DEVICE.
APPLICATION FILED APR. 14, 1908.

919,016.

Patented Apr. 20, 1909.

WITNESSES
Edward Thorpe
John K. Bradury

INVENTOR
Shoji Irino
BY
ATTORNEYS

UNITED STATES PATENT OFFICE.

SHOJI IRINO, OF SALT LAKE CITY, UTAH.

ROTARY MEASURING DEVICE.

No. 919,016.          Specification of Letters Patent.          Patented April 20, 1909.

Application filed April 14, 1908. Serial No. 426,932.

*To all whom it may concern:*

Be it known that I, SHOJI IRINO, a subject of the Emperor of Japan, and a resident of Salt Lake City, in the county of Salt Lake and State of Utah, have invented a new and Improved Rotary Measuring Device, of which the following is a full, clear, and exact description.

This invention relates to measuring devices, and more particularly to devices of this class each of which has a rotatable measuring wheel, distance indicating mechanism controlled thereby, a detent for holding the wheel immovable when it is not in use, and means for positioning the measuring wheel with its point of contact with the ground, at a predetermined distance from a fixed point, so that it is possible therewith to measure accurately a distance, starting from a wall or other obstruction.

An object of this invention is to provide a simple device which has means for indicating exactly, the distances measured thereby, in feet or inches or other suitable units, and which can be used for measuring distances starting at obstructions such as walls and the like.

A further object of the invention is to provide a device of the class described having the rotatable measuring wheel provided with an edge scale, and having a pointer indicating at the scale, and further having an elongated member or rule arranged at the extremity of the pointer and adapted to be adjusted to project beyond the periphery of the wheel so that it is possible to place the wheel with the point of contact with the ground, at a predetermined distance from an obstruction such as a wall, the predetermined distance being the length of the member.

The invention consists in the construction and combination of parts to be more fully described hereinafter and particularly set forth in the claims.

Reference is to be had to the accompanying drawings, forming a part of this specification, in which similar characters of reference indicate corresponding parts in all the views, and in which—

Figure 1:
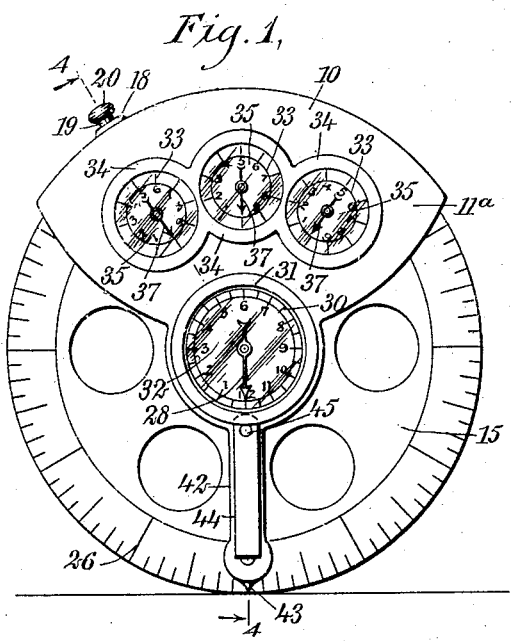
Figure 3:
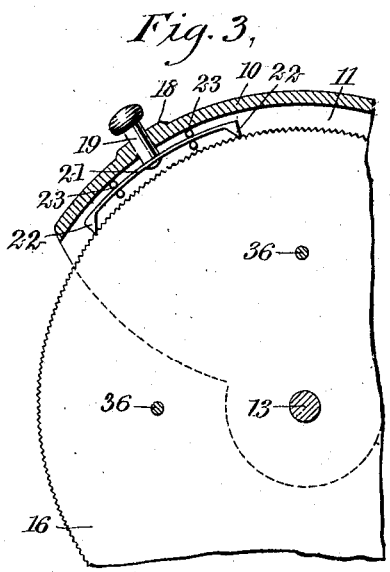
Figure 2:
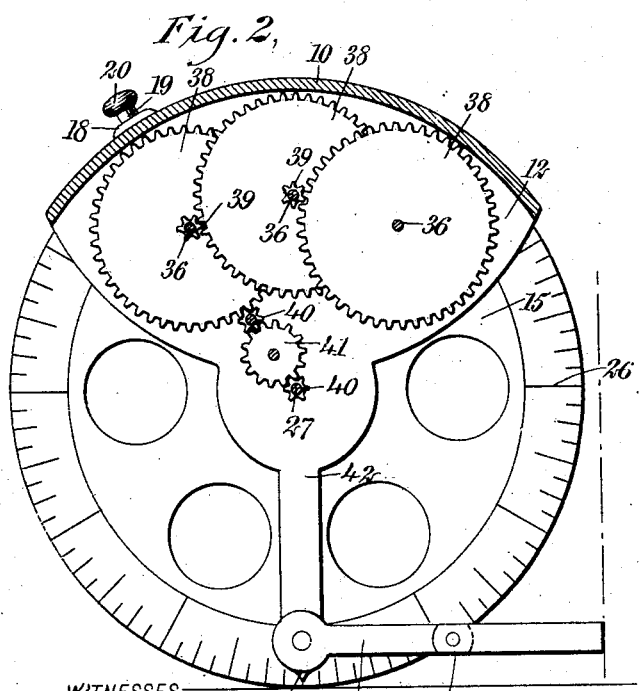
Figure 4:
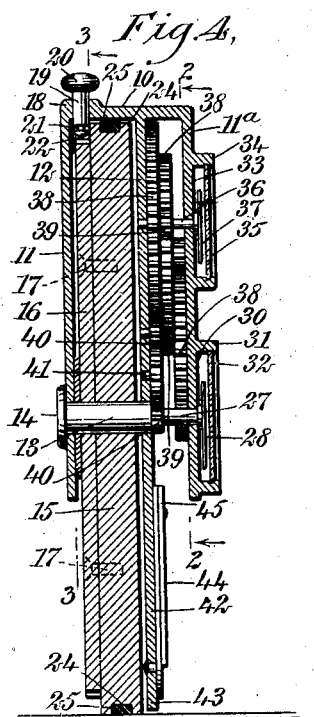

Figure 1 is a side elevation of my invention; Fig. 2 is an enlarged longitudinal section on the line 2—2 of Fig. 4; Fig. 3 is an enlarged longitudinal section of a part of the device on the line 3—3 of Fig. 4; and Fig. 4 is an enlarged section on the line 4—4 of Fig. 1.

Before proceeding to a more detailed explanation of my invention, it should be clearly understood that while I have shown, for example, a measuring device for determining distances or lengths in feet and inches, it can also be easily adapted for measuring in other units, for instance in the linear units of the metric system. Preferably, the rotatable measuring member or wheel has a radius of $\frac{12}{2 \times 3.14159}$ inches, so that the circumference is substantially one foot, or twelve inches. The measuring wheel is provided at the edge with a scale graduated to represent twelve inches, and it further controls a pointer which coöperates with a dial indicating inches from one to twelve. Additional dials are provided, which are graduated to represent tens, hundreds, and thousands of feet, and which have pointers connected by suitably proportioned gears and controlled by the measuring wheel. I provide a suitable normally operative detent for holding the wheel immovable when it is not in use.

As the wheel is of circular form it is impossible to arrange it adjacent to an obstruction such as a wall, and in a plane at right angles to the wall, with its point of contact with the ground, adjacent to the obstruction. Consequently, when a distance is measured, starting from such an obstruction, the resulting determination will be incorrect, as the measurement was not started exactly at the obstruction. To avoid this difficulty I provide an adjustable member of predetermined length, which permits the positioning of the measuring device with its point of contact with the ground at the same predetermined distance from the wall or other obstruction, and consequently, it is merely necessary to add to the final measurement a distance equal to the predetermined distance, to make the result correct.

Referring more particularly to the drawings, I provide a frame 10 fashioned from metal or any other suitable material and having opposite, substantially parallel sides 11 and 11ª. The sides are curved or tapered toward the extremities, as is shown most clearly in Fig. 1, and have therebetween a wall or partition 12 preferably integral with the frame 10. The side 11 and the wall 12 have a pivot pin 13 provided with a suitable head 14 engaging at the outside of the side 11. A rotatable measuring wheel or member 15 is mounted upon the pin 13 and is rigid therewith.

The wheel 15 has, at the side adjacent to the side 11 a notched plate or ratchet 16, secured thereto by means of screws 17 or in any other convenient manner. The frame 10 has a boss 18, provided with an opening in which is movably arranged a pin 19, having a head 20 by means of which it can be manually operated. At the inner end of the pin 19 is a flexible strip 21, having laterally disposed toes 22 at the ends, and forming a detent to engage at the peripherally notched plate 16. Studs 23 at the inside of the side 11 of the frame, engage the strip 21 and hold the toes 22 normally in engagement at the rim of the plate 16. The strip 21 is flexible, and by pressing upon the pin 19 it can be so bent that the toes 22 are lifted from engagement with the plate to permit the measuring wheel to rotate freely.

The wheel 15 is preferably provided with a groove 24 in the rim thereof, in which is located a tire 25 of rubber or the like to prevent the slipping of the wheel. The tire projects very slightly beyond the wheel and thus does not materially increase the diameter of the same. The wheel is provided at the side, near the edge, with a scale 26 graduated in inches or other units.

The pin 13 has a constricted extension 27 which projects through a suitable opening of the other side 11ª and carries a pointer 28 arranged to coöperate with a dial 30 mounted upon the side 11ª. The dial has a rim 31 and a covering glass 32, and is graduated in units similar to those of the scale upon the measuring wheel. As the latter is rigid with the pin 13 the pointer 28 will be actuated to correspond to the movements of the wheel. Further dials 33 are formed upon the side 11ª and have rims 34 and covering glasses 35. Pivot pins 36 are carried between the wall 12 and the side 11ª, and have pointers 37 arranged to coöperate with the dials 33. The pins 36 have rigid therewith, gear wheels and pinions 38 and 39, which are in mesh with each other, as is shown most clearly in Fig. 2, and which bear a certain relation according to the units of the scales. The first of the gear wheels 38 is controlled by the pin 13 through intermediate pinions 40 and 41. The arrangement is such that each time the measuring wheel makes a complete revolution the pointer 28 makes a complete revolution and the pointer 37, coöperating with the first dial 33, moves through one unit of the scale upon the first dial 33. The second dial 33 is moved one unit after the first pointer 37 has made a complete revolution of the first dial 33. The arrangement is the usual one in counters of this type.

The wall 12 is extended to form a pointer 42, having the extremity 43 indicating at the scale 26 of the measuring wheel. A member 44 is pivoted upon the pointer 42 near the extremity thereof, and has a joint 45 so that it can be varied and adjusted to lie alined with the pointer. The member 44 is of predetermined length and can be adjusted to project beyond the periphery of the measuring wheel, as is shown most clearly in Fig. 2, to permit the positioning of the measuring wheel with its point of contact with the ground, at the predetermined distance from the obstruction, such as a wall.

Having thus described my invention, I claim as new, and desire to secure by Letters Patent:—

1. In a rotary measuring device, a measuring member, a pointer indicating at the edge of said member, and a further member permanently secured to and arranged adjacent to the indicating part of said pointer and adjustable to project beyond the edge of said measuring member, said further member being of predetermined length, and being foldable into an inoperative position within the periphery of said measuring member.

2. A rotary measuring device, comprising a rotatable measuring member, distance indicating means controlled by said member, a detent for said member, a pointer indicating at the edge of said member, and a further member secured to and normally arranged adjacent to said pointer and adjustable to project beyond the edge of said measuring member, said further member being of predetermined length, and being normally inoperative.

3. A rotary measuring device, comprising a rotatable measuring member, a pointer therefor, distance indicating means controlled by said member, a detent for said member, and means for positioning the device with the point of contact of the member with the ground, at a predetermined distance from a fixed point, said last mentioned means being movable into an inoperative position and being secured to said pointer.

4. A rotary measuring device, comprising a frame having sides, and a wall therebetween, a measuring wheel mounted between said wall and one of said sides, dials upon the other of said sides, a pointer rigid with said wheel and arranged to coöperate with one of said dials, a further pointer arranged to coöperate with the other of said dials, means for operatively connecting said first pointer and said other pointer, a normally operative detent for said wheel, and means for positioning the device with the point of contact of the wheel with the ground, at a predetermined distance from a fixed point.

In testimony whereof I have signed my name to this specification in the presence of two subscribing witnesses.

SHOJI IRINO.

Witnesses:
  BENJ. R. HOWELL,
  W. D. RITER.